(12) United States Patent
Lee et al.

(10) Patent No.: US 11,312,263 B2
(45) Date of Patent: Apr. 26, 2022

(54) METHOD AND SYSTEM FOR CONTROLLING OPERATION OF FUEL CELL OF FUEL CELL VEHICLE

(71) Applicants: Hyundai Motor Company, Seoul (KR); Kia Motors Corporation, Seoul (KR)

(72) Inventors: Seung Yoon Lee, Seoul (KR); Jeong Kyu Park, Gyeonggi-do (KR); Sae Byeok Seung, Gyeonggi-do (KR); Byoung Hoon Choi, Gyeonggi-do (KR); Sang Chul Yeom, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 256 days.

(21) Appl. No.: 16/807,819

(22) Filed: Mar. 3, 2020

(65) Prior Publication Data

US 2021/0078440 A1 Mar. 18, 2021

(30) Foreign Application Priority Data

Sep. 16, 2019 (KR) .................. 10-2019-0113284

(51) Int. Cl.
*B60L 58/13* (2019.01)
*B60W 10/28* (2006.01)
*B60L 50/71* (2019.01)
*B60L 58/30* (2019.01)

(52) U.S. Cl.
CPC ............... *B60L 58/13* (2019.02); *B60L 50/71* (2019.02); *B60L 58/30* (2019.02); *B60W 10/28* (2013.01)

(58) Field of Classification Search
None
See application file for complete search history.

(56) References Cited

U.S. PATENT DOCUMENTS

| 4,961,151 A | * | 10/1990 | Early | H02J 7/34 700/297 |
|---|---|---|---|---|
| 2017/0166081 A1 | * | 6/2017 | Kwon | H01M 8/04947 |
| 2018/0072159 A1 | * | 3/2018 | Wampler, II | B60L 58/24 |
| 2018/0241099 A1 | * | 8/2018 | Watanabe | H02J 7/00712 |

FOREIGN PATENT DOCUMENTS

| KR | 10-2006-0069136 A | 6/2006 |
|---|---|---|
| KR | 10-2018-0134603 | 12/2018 |

\* cited by examiner

*Primary Examiner* — Jared Fureman
*Assistant Examiner* — Joel Barnett
(74) *Attorney, Agent, or Firm* — Mintz Levin Cohn Ferris Glovsky and Popeo, P.C.; Peter F. Corless (57) ABSTRACT

A method for controlling an operation of a fuel cell of a fuel cell vehicle is provided. The method includes detecting a state of charge (SOC) of a high voltage battery and determining whether the detected SOC of the high voltage battery is within or beyond a preset range from a minimum recommended SOC to a maximum recommended SOC. Power generation of the fuel cell is performed or stopped by comparing a required current of the vehicle with a preset current value required to enter a fuel-cell stop mode in which the power generation of the fuel cell is stopped and a preset current value required to release the fuel-cell stop mode.

19 Claims, 3 Drawing Sheets

METHOD AND SYSTEM FOR CONTROLLING OPERATION OF FUEL CELL OF FUEL CELL VEHICLE

CROSS REFERENCE TO RELATED APPLICATION

The present application claims priority to Korean Patent Application No. 10-2019-0113284, filed Sep. 16, 2019, the entire contents of which is incorporated herein for all purposes by this reference.

BACKGROUND

Field of the Disclosure

The present disclosure relates to a method and system for controlling an operation of a fuel cell of a fuel cell vehicle, and more particularly, to a method and system for controlling an operation of a fuel cell of a fuel cell vehicle, that efficiently manages a state of charge (SOC) of a high voltage battery by performing or stopping the power generation of the fuel cell based on the SOC of the high voltage battery.

Description of the Related Art

A fuel cell vehicle is a hybrid vehicle equipped with a fuel cell stack that produces/generates power and a high voltage battery that stores produced/regenerated power to use the power when necessary. The management of a SOC of a high voltage battery of the fuel cell vehicle improves fuel efficiency, operational stability, ride comfort, and marketability of the vehicle. The efficient management of the SOC is important to improve the marketability of the vehicle.

Furthermore, the fuel cell stack for producing hydrogen power is activated (e.g., fuel cell On or FC On) when necessary to supply hydrogen and oxygen and thereby produce power. When the vehicle is driven without the power generation of the fuel cell stack, an FC Stop function of blocking oxygen supplied to the fuel cell stack thereby stopping the power generation of the fuel cell stack is performed.

Additionally, the efficient management of the SOC of the high voltage battery in the fuel cell vehicle is one of core technologies of the fuel cell vehicle to improve the marketability of the vehicle as well as the fuel efficiency, operability, and ride comfort of the fuel cell vehicle. Accordingly, a conventional fuel cell vehicle manages the SOC of the high voltage battery by comparing a required current of the vehicle with a preset current value required to enter a stop mode in which the power generation of a fuel cell is stopped and a preset current value required to release the fuel-cell stop mode.

However, in the conventional fuel cell vehicle, the SOC of the high voltage battery is managed based on the uniform preset current value required to enter the stop mode in which the power generation of the fuel cell is stopped and the uniform preset current value required to release the fuel-cell stop mode without considering the SOC of the high voltage battery, and thus, the SOC of the high voltage battery is unable to be efficiently managed and the operation of the fuel cell stack is also unable to be efficiently managed.

The description provided above as a related art of the present disclosure is merely for helping understanding the background of the present disclosure and should not be construed as being included in the related art known by those skilled in the art.

SUMMARY

The present disclosure provides a method and system for controlling an operation of a fuel cell, which are capable of efficiently managing an SOC of a high voltage battery and consequently improving the fuel efficiency of the vehicle by performing or stopping the power generation of the fuel cell based on a range including the detected SOC of the high voltage battery, a current value required to enter a fuel-cell stop mode, and a current value required to release the fuel-cell stop mode.

In order to achieve the object of the present disclosure, the disclosure provides a method for controlling an operation of a fuel cell of a fuel cell vehicle that may include detecting a state of charge (SOC) of a high voltage battery; determining whether the detected SOC of the high voltage battery is equal to or greater than a preset range from a minimum recommended SOC to a maximum recommended SOC; and performing or stopping power generation of the fuel cell by comparing a required current of the vehicle with a preset current value required to enter a fuel-cell stop mode in which the power generation of the fuel cell is stopped and a preset current value required to release the fuel-cell stop mode.

At the performing or stopping of the power generation of the fuel cell by comparing the required current of the vehicle with the preset current value required to enter the stop mode in which the fuel cell stops generating power and the preset current value required to release the fuel-cell stop mode, when the required current of the vehicle is within the preset range from the minimum recommended SOC to the maximum recommended SOC, the fuel cell may be operated to perform or stop the power generation by comparing the required current of the vehicle with a preset first current value required to enter the fuel-cell stop mode and a preset first current value required to release the fuel-cell stop mode.

Each of the first current value required to enter the fuel-cell stop mode and the first current value required to release the fuel-cell stop mode may be a fixed value. When the required current of the vehicle becomes equal to or less than the first current value required to enter the fuel-cell stop mode when the required current of the vehicle is within the preset range from the minimum recommended SOC to the maximum recommended SOC and the fuel cell is generating power, the fuel cell may stop generating power.

When the required current of the vehicle becomes equal to or greater than the first current value required to release the fuel-cell stop mode when the required current of the vehicle is within the preset range from the minimum recommended SOC to the maximum recommended SOC and the fuel cell is being stopped, the fuel cell may generate power. Additionally, when the required current of the vehicle is within the preset range from the minimum recommended SOC to the maximum recommended SOC and the required current of the vehicle is between the first current value required to enter the fuel-cell stop mode and the first current value required to release the fuel-cell stop mode, a preceding operation state of the fuel cell may be maintained.

At the performing or stopping of the power generation of the fuel cell by comparing the required current of the vehicle with the preset current value required to enter the stop mode in which the fuel cell stops generating power and the preset current value required to release the fuel-cell stop mode, when the required current of the vehicle is greater than the preset range from the minimum recommended SOC to the maximum recommended SOC, the fuel cell may be operated to perform or stop the power generation by comparing the required current of the vehicle with a preset second current value required to enter the fuel-cell stop mode and a preset second current value required to release the fuel-cell stop mode.

Each of the second current value required to enter the fuel-cell stop mode and the second current value required to release the fuel-cell stop mode may be a value that varies linearly in proportion to the SOC of the high voltage battery. When the required current of the vehicle becomes equal to or less than the second current value required to enter the fuel-cell stop mode when the required current of the vehicle is beyond the preset range from the minimum recommended SOC to the maximum recommended SOC and the fuel cell is generating power, the fuel cell may stop generating power.

When the required current of the vehicle becomes equal to or greater than the second current value required to release the fuel-cell stop mode when the required current of the vehicle is beyond the preset range from the minimum recommended SOC to the maximum recommended SOC and the fuel cell is being stopped, the fuel cell may generate power. In addition, when the required current of the vehicle is beyond the preset range from the minimum recommended SOC to the maximum recommended SOC and the required current of the vehicle is between the second current value required to enter the fuel-cell stop mode and the second current value required to release the fuel-cell stop mode, a preceding operation state of the fuel cell may be maintained.

Another aspect of the disclosure provides a system for controlling an operation of a fuel cell of a fuel cell vehicle that may include a sensor configured to detect a SOC of a high voltage battery; a database configured to store preset minimum recommended SOC data and maximum recommended SOC data of the high voltage battery, data regarding a preset current value required to enter a fuel-cell stop mode in which power generation of a fuel cell is stopped, and data regarding a preset current value required to release the fuel-cell stop mode; and a controller configured to perform or stop the power generation of the fuel cell by comparing a required current of the vehicle with the current value required to enter the stop mode and the current value required to release the fuel-cell stop mode, the current values being stored in the database.

The data regarding the preset current value required to enter the fuel-cell stop mode in which the fuel cell stops generating power, and the data on the preset current value required to release the fuel-cell stop mode, which are stored in the database, may include data regarding a first current value required to enter the fuel-cell stop mode, data regarding a first current value required to release the fuel-cell stop mode, data regarding a second current value required to enter the fuel-cell stop mode and data regarding a second current value required to release the fuel-cell stop mode.

Each of the first current value required to enter the fuel-cell stop mode and the first current value required to release the fuel-cell stop mode may be a fixed value, and each of the second current value required to enter the fuel-cell stop mode and the second current value required to release the fuel-cell stop mode may be a value that varies linearly in proportion to the SOC of the high voltage battery. The controller may be configured to operate the fuel cell to perform or stop the power generation of the fuel cell by comparing the required current of the vehicle with a preset first current value required to enter the fuel-cell stop mode and first current value required to release the fuel-cell stop mode, when the required current of the vehicle is within the preset range from the minimum recommended SOC to the maximum recommended SOC.

Additionally, the controller may be configured to stop the power generation of the fuel cell when the required current of the vehicle becomes equal to or less than the first current value required to enter the fuel-cell stop mode when the required current of the vehicle is within the preset range from the minimum recommended SOC to the maximum recommended SOC and the fuel cell is generating power. The controller may be configured to perform the power generation of the fuel cell when the required current of the vehicle becomes equal to or greater than the first current value required to release the fuel-cell stop mode when the required current of the vehicle is beyond the preset range from the minimum recommended SOC to the maximum recommended SOC and the fuel cell is being stopped.

The controller may be configured to maintain a preceding operation state of the fuel cell, when the required current of the vehicle is within the preset range from the minimum recommended SOC to the maximum recommended SOC and the required current of the vehicle is between the first current value required to enter the fuel-cell stop mode and the first current value required to release the fuel-cell stop mode. The controller may further be configured to perform or stop the power generation of the fuel cell by comparing the required current of the vehicle with a preset second current value required to enter the fuel-cell stop mode and a preset second current value required to release the fuel-cell stop mode, when the required current of the vehicle is beyond the preset range from the minimum recommended SOC to the maximum recommended SOC.

Additionally, the controller may be configured to stop the power generation of the fuel cell when the required current of the vehicle becomes equal to or less than the second current value required to enter the fuel-cell stop mode when the required current of the vehicle is beyond the preset range from the minimum recommended SOC to the maximum recommended SOC and the fuel cell is generating power. The controller may be configured to perform the power generation of the fuel cell when the required current of the vehicle becomes equal to or greater than the second current value required to release the fuel-cell stop mode when the required current of the vehicle is beyond the preset range from the minimum recommended SOC to the maximum recommended SOC and the fuel cell is being stopped.

The controller may also be configured to maintain a preceding operation state of the fuel cell, when the required current of the vehicle is beyond the preset range from the minimum recommended SOC to the maximum recommended SOC and the required current of the vehicle is between the second current value required to enter the fuel-cell stop mode and the second current value required to release the fuel-cell stop mode.

As described above, a system and method for controlling an operation of a fuel cell of a fuel cell vehicle in accordance with an exemplary embodiment of the present disclosure has the following effects.

First, when a detected SOC of a high voltage battery is equal to or less than a preset minimum recommended SOC or is equal to or greater than a preset maximum recommended SOC, a second current value required to enter a fuel-cell stop mode and a second current value required to release the fuel-cell stop mode, which vary linearly in proportion to the SOC of the high voltage battery, may be compared with the detected SOC of the high voltage battery to operate the fuel cell, thus minimizing overcharge and overdischarge sections of the high voltage battery and thereby improving the fuel efficiency of the vehicle.

Second, the durability of the high voltage battery may be improved by reducing the overcharge and overdischarge sections of the high voltage battery.

Third, by reducing the overcharge and overdischarge sections of the high voltage battery, a section unable to assist when the additional output of the vehicle is needed due to the overdischarge of the high voltage battery and a section unable to use a regenerative braking function when the regenerative braking of the vehicle is possible due to overcharge may be minimized, thus maintaining the ride comfort of the vehicle and improving the marketability of the vehicle.

Fourth, by efficiently managing the SOC of the high voltage battery, an operating section in which the fuel cell may be stably operated is improved, thus improving the overall durability of the vehicle.

Fifth, by linearly varying the second current value required to enter the fuel-cell stop mode and the second current value required to release the fuel-cell stop mode in proportion to the SOC of the high voltage battery when the detected SOC of the high voltage battery is equal to or greater than the preset maximum recommended SOC, a fuel-cell stop mode entry condition may be mitigated and a fuel-cell stop mode release condition may be strengthened, thus minimizing the unnecessary operation of the fuel cell.

Sixth, by linearly varying the second current value required to enter the fuel-cell stop mode and the second current value required to release the fuel-cell stop mode in proportion to the SOC of the high voltage battery when the detected SOC of the high voltage battery is equal to or less than the preset minimum recommended SOC, the fuel-cell stop mode entry condition may be strengthened and the fuel-cell stop mode release condition may be mitigated, thus improving the activating section of the fuel cell and consequently allowing the SOC of the high voltage battery to be efficiently managed.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present disclosure will be described in detail with reference to the accompanying drawings. The terms or words used in the specification and the claims of the present disclosure should not be interpreted as being limited merely to common and dictionary meanings. On the contrary, they should be interpreted on the basis of the meanings and concepts of the disclosure in keeping with the scope of the disclosure on the basis of the principle that the inventor(s) can appropriately define the terms in order to describe the disclosure in the best way. Thus, it should be understood that the form of the disclosure shown and described herein is to be taken as a preferred embodiment of the same and that all changes that fall within bounds of the claims, or equivalence of such bounds are intended to be embraced by the claims.

Figure 1:
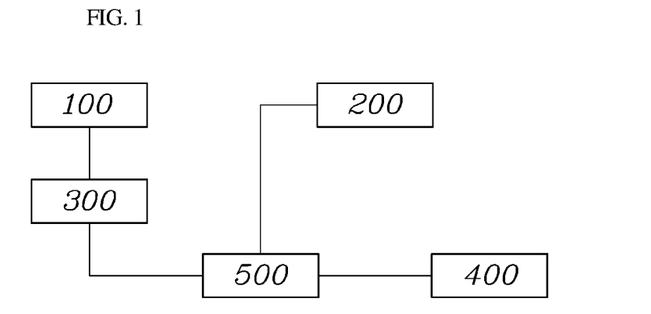
FIG. 1 is a block diagram showing the configuration of a system for controlling an operation of a fuel cell of a fuel cell vehicle in accordance with an exemplary embodiment of the present disclosure.

FIG. 1 is a block diagram showing the configuration of a system for controlling an operation of a fuel cell of a fuel cell vehicle in accordance with an exemplary embodiment of the present disclosure. Further, FIG. 2 is a diagram showing a map including preset minimum recommended SOC data and maximum recommended SOC data of a high voltage battery, and data regarding a preset current value required to enter a stop mode in which the power generation of the fuel cell is stopped and a preset current value required to release the fuel-cell stop mode, the data being stored in a database.

Referring to FIG. 1, the system for controlling the operation of the fuel cell of the fuel cell vehicle in accordance with the exemplary embodiment of the present disclosure may include a sensor 300 configured to detect a SOC of a high voltage battery 100, a database 400 configured to store preset minimum recommended SOC data and maximum recommended SOC data of the high voltage battery, data regarding a preset current value required to enter a fuel-cell stop mode in which the power generation of the fuel cell is stopped, and data regarding a preset current value required to release the fuel-cell stop mode, and a controller 500 configured to perform or stop the power generation of the fuel cell 200 by comparing a required current of the vehicle with the current value required to enter the stop mode and the current value required to release the fuel-cell stop mode, the current values being stored in the database 400. Notably, the controller 500 may also be configured to operate the other components within the system.

Specifically, the data regarding the preset current value required to enter the stop mode in which the power generation of the fuel cell 200 is stopped, and the data regarding the preset current value required to release the fuel-cell stop mode may include data regarding a first current value required to enter the fuel-cell stop mode, a first current value required to release the fuel-cell stop mode, a second current value required to enter the fuel-cell stop mode, and a second current value required to release the fuel-cell stop mode. To be more specific, referring to FIG. 2, each of the first current value required to enter the fuel-cell stop mode and the first current value required to release the fuel-cell stop mode is a fixed value.

Figure 2:
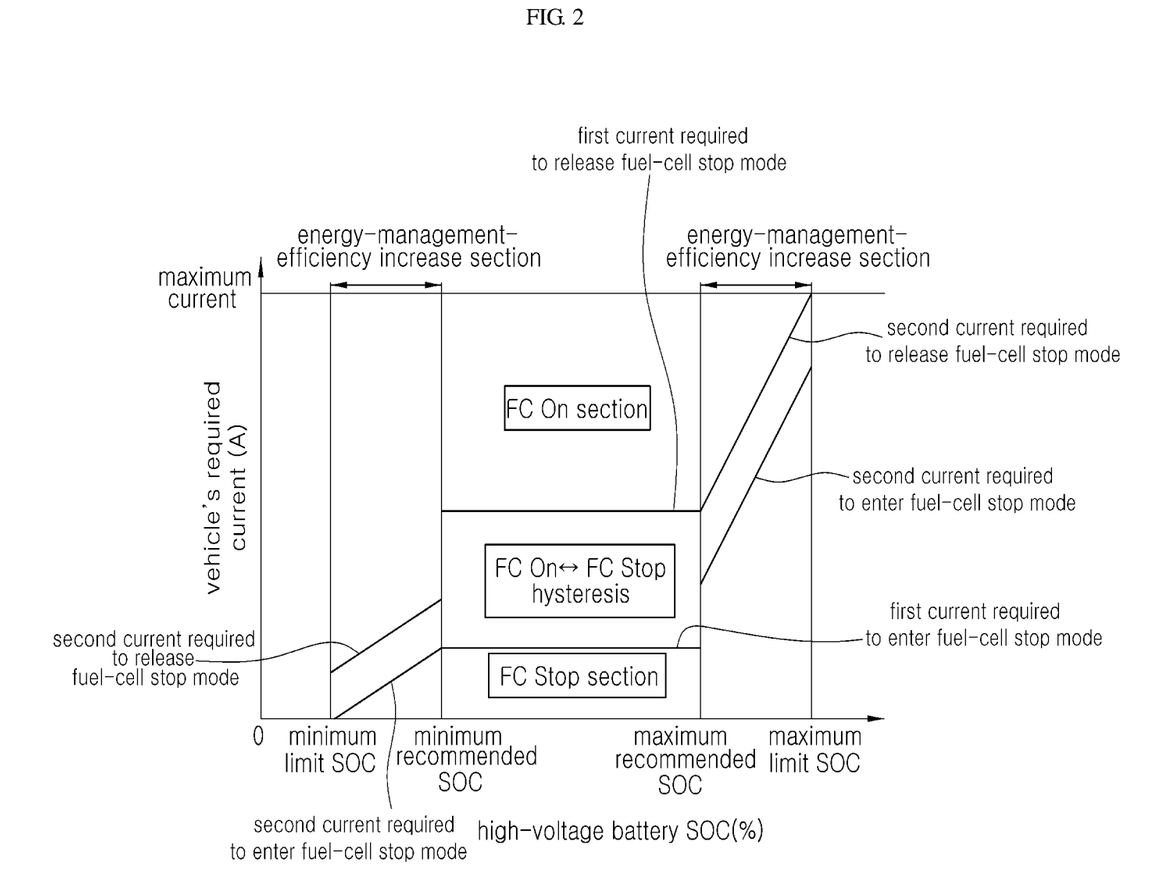
FIG. 2 is a diagram showing a map including preset minimum recommended SOC data and maximum recommended SOC data of a high voltage battery, and data regarding a preset current value required to enter a stop mode in which the power generation of the fuel cell is stopped and a preset current value required to release the fuel-cell stop mode in accordance with the exemplary embodiment of the present disclosure.

Furthermore, each of the second current value required to enter the fuel-cell stop mode and the second current value required to release the fuel-cell stop mode is a value that varies linearly in proportion to the SOC of the high voltage battery, as shown in FIG. 2. Although it will be described below in more detail, in the present disclosure, depending on whether the SOC of the high voltage battery detected in the sensor 300 is within or beyond (e.g., equal to or greater than) a range from a minimum recommended SOC to a maximum recommended SOC, the current value required to enter the fuel-cell stop mode and the current value required to release the fuel-cell stop mode may be changed to control the operation of the fuel cell, thus efficiently managing the SOC of the high voltage battery and efficiently improving the overall fuel efficiency of the vehicle.

Hereinafter, the operation of the controller to perform or stop the power generation of the fuel cell based on the required current of the vehicle and the data stored in the database will be described in more detail with reference to FIG. 2. First, when the required current of the vehicle is within a preset range from the minimum recommended SOC to the maximum recommended SOC, the controller 500 may be configured to perform or stop the power generation of the fuel cell by comparing the required current of the vehicle with the preset first current value required to enter the fuel-cell stop mode and the preset first current value required to release the fuel-cell stop mode.

Specifically, when the required current of the vehicle becomes equal to or less than the first current value required to enter the fuel-cell stop mode when the required current of the vehicle is within the preset range from the minimum recommended SOC (e.g., about 20%) to the maximum recommended SOC (e.g., about 80%) and the fuel cell is generating power, the controller 500 may be configured to stop the power generation of the fuel cell. Furthermore, when the required current of the vehicle becomes equal to or greater than the first current value required to release the fuel-cell stop mode when the required current of the vehicle is within the preset range from the minimum recommended SOC to the maximum recommended SOC and the fuel cell is being stopped, the controller 500 may be configured to perform the power generation of the fuel cell.

In particular, the expression "the power generation of the fuel cell" may indicate that the fuel cell is activated to supply hydrogen and oxygen and thereby generate power. The expression "the stop of the fuel cell" may indicate that oxygen supplied to the fuel cell is blocked, so that the fuel cell stops generating power. When the required current of the vehicle is within the preset range from the minimum recommended SOC to the maximum recommended SOC and the required current of the vehicle is between the first current value required to enter the fuel-cell stop mode and the first current value required to release the fuel-cell stop mode, the controller 500 may be configured to maintain the preceding operation state of the fuel cell.

According to an exemplary embodiment, when the required current of the vehicle is between the first current value required to enter the fuel-cell stop mode and the first current value required to release the fuel-cell stop mode in the state where the fuel cell is generating power, the controller 500 may be configured to maintain the power generating state of the fuel cell. In contrast, when the required current of the vehicle is between the first current value required to enter the fuel-cell stop mode and the first current value required to release the fuel-cell stop mode in the state where the fuel cell is being stopped, the controller 500 may be configured to maintain the stop state of the fuel cell.

Meanwhile, when the required current of the vehicle is beyond the preset range from the minimum recommended SOC to the maximum recommended SOC, the controller 500 may be configured to perform or stop the power generation of the fuel cell by comparing the required current of the vehicle with the preset second current value required to enter the fuel-cell stop mode and the preset second current value required to release the fuel-cell stop mode. Specifically, when the required current of the vehicle becomes equal to or less than the second current value required to enter the fuel-cell stop mode when the required current of the vehicle is beyond or greater than the preset range from the minimum recommended SOC to the maximum recommended SOC and the fuel cell is generating power, the controller 500 may be configured to stop the power generation of the fuel cell.

In addition, when the required current of the vehicle becomes equal to or greater than the second current value required to release the fuel-cell stop mode when the required current of the vehicle is beyond the preset range from the minimum recommended SOC to the maximum recommended SOC and the fuel cell is being stopped, the controller 500 may be configured to perform the power generation of the fuel cell. Particularly, when the required current of the vehicle is beyond the preset range from the minimum recommended SOC to the maximum recommended SOC and the required current of the vehicle is between the second current value required to enter the fuel-cell stop mode and the second current value required to release the fuel-cell stop mode, the controller 500 may be configured to maintain the preceding operation state of the fuel cell.

Figure 3:
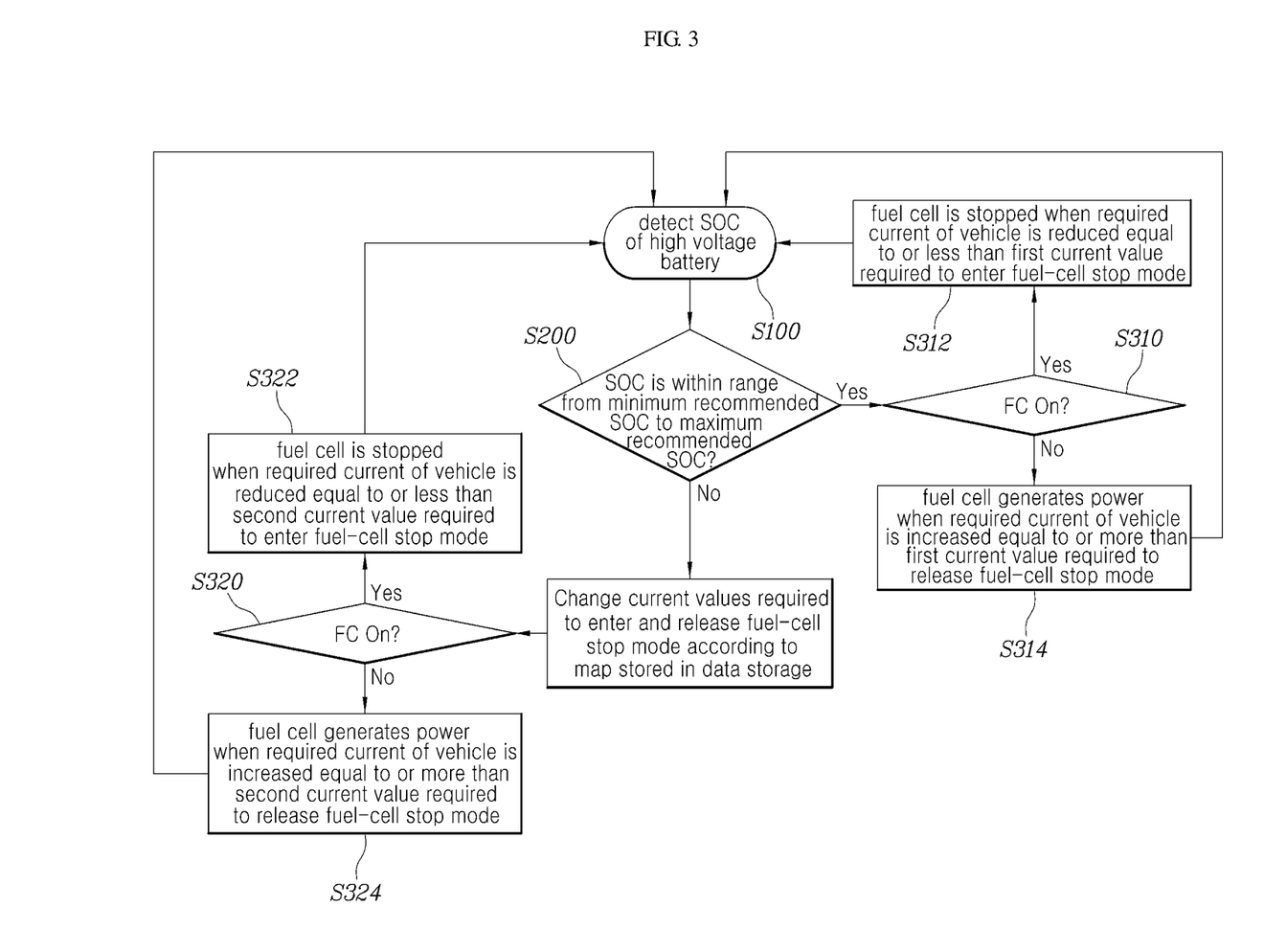
FIG. 3 is a flowchart showing a method for controlling an operation of a fuel cell of a fuel cell vehicle in accordance with an exemplary embodiment of the present disclosure.

FIG. 3 is a flowchart showing a method for controlling an operation of a fuel cell of a fuel cell vehicle in accordance with an exemplary embodiment of the present disclosure. Referring to FIG. 3, the method for controlling the operation of the fuel cell of the fuel cell vehicle in accordance with the exemplary embodiment of the present disclosure may include detecting an SOC of a high voltage battery (S100), determining whether the detected SOC of the high voltage battery is within or beyond a preset range from a minimum recommended SOC to a maximum recommended SOC (S200), and performing or stopping the power generation of the fuel cell by comparing a required current of the vehicle with a preset current value required to enter a fuel-cell stop mode in which the power generation of the fuel cell is stopped and a preset current value required to release the fuel-cell stop mode (S300).

In the performing or stopping of the power generation of the fuel cell by comparing the required current of the vehicle with the preset current value required to enter the stop mode in which the fuel cell stops generating power and the preset current value required to release the fuel-cell stop mode, when the required current of the vehicle is within the preset range from the minimum recommended SOC to the maximum recommended SOC (S310), the fuel cell may be operated to perform or stop the power generation by comparing the required current of the vehicle with a preset first current value required to enter the fuel-cell stop mode and first current value required to release the fuel-cell stop mode. Each of the first current value required to enter the fuel-cell stop mode and the first current value required to release the fuel-cell stop mode may be a fixed value.

Particularly, in the performing or stopping of the power generation of the fuel cell by comparing the required current of the vehicle with the preset current value required to enter the stop mode in which the fuel cell stops generating power and the preset current value required to release the fuel-cell stop mode, when the required current of the vehicle becomes equal to or less than the first current value required to enter the fuel-cell stop mode when the required current of the vehicle is within the preset range from the minimum recommended SOC to the maximum recommended SOC and the fuel cell is generating power (S312), the fuel cell may stop generating power.

Furthermore, when the required current of the vehicle becomes equal to or greater than the first current value required to release the fuel-cell stop mode when the required current of the vehicle is within the preset range from the minimum recommended SOC to the maximum recommended SOC and the fuel cell is being stopped (S314), the fuel cell may generate power. In addition, when the required current of the vehicle is within the preset range from the minimum recommended SOC to the maximum recommended SOC and the required current of the vehicle is between the first current value required to enter the fuel-cell stop mode and the first current value required to release the fuel-cell stop mode, the preceding operation state of the fuel cell may be maintained.

Meanwhile, when the required current of the vehicle is beyond the preset range from the minimum recommended SOC to the maximum recommended SOC (S320), the fuel cell may be operated to perform or stop the power generation by comparing the required current of the vehicle with a preset second current value required to enter the fuel-cell stop mode and second current value required to release the fuel-cell stop mode. Each of the second current value required to enter the fuel-cell stop mode and the second current value required to release the fuel-cell stop mode may be a value that varies linearly in proportion to the SOC of the high voltage battery.

Specifically, when the required current of the vehicle becomes equal to or less than the second current value required to enter the fuel-cell stop mode when the required current of the vehicle is beyond the preset range from the minimum recommended SOC to the maximum recommended SOC and the fuel cell is generating power (S322), the fuel cell may stop generating power. Additionally, when the required current of the vehicle becomes equal to or greater than the second current value required to release the fuel-cell stop mode when the required current of the vehicle is beyond the preset range from the minimum recommended SOC to the maximum recommended SOC and the fuel cell is being stopped (S324), the fuel cell may generate power. When the required current of the vehicle is beyond the preset range from the minimum recommended SOC to the maximum recommended SOC and the required current of the vehicle is between the second current value required to enter the fuel-cell stop mode and the second current value required to release the fuel-cell stop mode, the preceding operation state of the fuel cell may be maintained.

As described above, a system and method for controlling an operation of a fuel cell of a fuel cell vehicle in accordance with an exemplary embodiment of the present disclosure has the following effects.

First, when a detected SOC of a high voltage battery is equal to or less than a preset minimum recommended SOC or is equal to or greater than a preset maximum recommended SOC, a second current value required to enter a fuel-cell stop mode and a second current value required to release the fuel-cell stop mode, which vary linearly in proportion to the SOC of the high voltage battery, may be compared with the detected SOC of the high voltage battery to control the operation of the fuel cell, thus minimizing overcharge and overdischarge sections of the high voltage battery and thereby improving the fuel efficiency of the vehicle.

Second, the durability of the high voltage battery may be improved by reducing the overcharge and overdischarge sections of the high voltage battery.

Third, by reducing the overcharge and overdischarge sections of the high voltage battery, a section unable to assist when the additional output of the vehicle is needed due to the overdischarge of the high voltage battery and a section unable to use a regenerative braking function when the regenerative braking of the vehicle is possible due to overcharge may be minimized, thus maintaining the ride comfort of the vehicle and improving the marketability of the vehicle.

Fourth, by efficiently managing the SOC of the high voltage battery, an operating section in which the fuel cell may be stably operated is improved, thus improving the overall durability of the vehicle.

Fifth, by linearly varying the second current value required to enter the fuel-cell stop mode and the second current value required to release the fuel-cell stop mode in proportion to the SOC of the high voltage battery when the detected SOC of the high voltage battery is equal to or greater than the preset maximum recommended SOC, a fuel-cell stop mode entry condition may be mitigated and a fuel-cell stop mode release condition may be strengthened, thus minimizing the unnecessary operation of the fuel cell.

Sixth, by linearly varying the second current value required to enter the fuel-cell stop mode and the second current value required to release the fuel-cell stop mode in proportion to the SOC of the high voltage battery when the detected SOC of the high voltage battery is equal to or less than the preset minimum recommended SOC, the fuel-cell stop mode entry condition may be strengthened and the fuel-cell stop mode release condition may be mitigated, thus improving the activating section of the fuel cell and consequently allowing the SOC of the high voltage battery to be efficiently managed.

Although the present disclosure was described with reference to specific exemplary embodiments shown in the drawings, it is apparent to those skilled in the art that the present disclosure may be changed and modified in various ways without departing from the scope of the present disclosure, which is described in the following claims.

What is claimed is:

1. A method for controlling an operation of a fuel cell of a fuel cell vehicle, comprising:
    detecting, by a controller, a state of charge (SOC) of a high voltage battery;
    determining, by the controller, whether the detected SOC of the high voltage battery is within or beyond a preset range from a minimum recommended SOC to a maximum recommended SOC; and
    performing or stopping, by the controller, power generation of the fuel cell by comparing a required current of the vehicle with a preset current value required to enter a fuel-cell stop mode in which the power generation of the fuel cell is stopped and a preset current value required to release the fuel-cell stop mode.

2. The method of claim 1, wherein when the required current of the vehicle is within the preset range from the minimum recommended SOC to the maximum recommended SOC, the fuel cell is operated by the controller to perform or stop the power generation by comparing the required current of the vehicle with a preset first current value required to enter the fuel-cell stop mode and a preset first current value required to release the fuel-cell stop mode.

3. The method of claim 2, wherein each of the first current value required to enter the fuel-cell stop mode and the first current value required to release the fuel-cell stop mode is a fixed value.

4. The method of claim 2, wherein when the required current of the vehicle becomes equal to or less than the first current value required to enter the fuel-cell stop mode when the required current of the vehicle is within the preset range from the minimum recommended SOC to the maximum recommended SOC and the fuel cell is generating power, the fuel cell stops generating power.

5. The method of claim 2, wherein when the required current of the vehicle becomes equal to or greater than the first current value required to release the fuel-cell stop mode when the required current of the vehicle is within the preset range from the minimum recommended SOC to the maximum recommended SOC and the fuel cell is being stopped, the fuel cell generates power.

6. The method of claim 2, wherein when the required current of the vehicle is within the preset range from the minimum recommended SOC to the maximum recommended SOC and the required current of the vehicle is between the first current value required to enter the fuel-cell stop mode and the first current value required to release the fuel-cell stop mode, a preceding operation state of the fuel cell is maintained.

7. The method of claim 1, wherein when the required current of the vehicle is beyond the preset range from the minimum recommended SOC to the maximum recommended SOC, the fuel cell is operated to perform or stop the power generation by comparing the required current of the vehicle with a preset second current value required to enter the fuel-cell stop mode and a preset second current value required to release the fuel-cell stop mode.

8. The method of claim 7, wherein each of the second current value required to enter the fuel-cell stop mode and the second current value required to release the fuel-cell stop mode is a value that varies linearly in proportion to the SOC of the high voltage battery.

9. The method of claim 7, wherein when the required current of the vehicle becomes equal to or less than the second current value required to enter the fuel-cell stop mode when the required current of the vehicle is beyond the preset range from the minimum recommended SOC to the maximum recommended SOC and the fuel cell is generating power, the fuel cell stops generating power.

10. The method of claim 7, wherein when the required current of the vehicle becomes equal to or greater than the second current value required to release the fuel-cell stop mode when the required current of the vehicle is beyond the preset range from the minimum recommended SOC to the maximum recommended SOC and the fuel cell is being stopped, the fuel cell generates power.

11. The method of claim 7, wherein when the required current of the vehicle is beyond the preset range from the minimum recommended SOC to the maximum recommended SOC and the required current of the vehicle is between the second current value required to enter the fuel-cell stop mode and the second current value required to release the fuel-cell stop mode, a preceding operation state of the fuel cell is maintained.

12. A system for controlling an operation of a fuel cell of a fuel cell vehicle, comprising:
    a sensor configured to detect a state of charge (SOC) of a high voltage battery;
    a database configured to store preset minimum recommended SOC data and maximum recommended SOC data of the high voltage battery, data regarding a preset current value required to enter a fuel-cell stop mode in which power generation of a fuel cell is stopped, and data regarding a preset current value required to release the fuel-cell stop mode; and
    a controller configured to perform or stop the power generation of the fuel cell by comparing a required current of the vehicle with the current value required to enter the stop mode and the current value required to release the fuel-cell stop mode, the current values being stored in the database.

13. The system of claim 12, wherein the data regarding the preset current value required to enter the fuel-cell stop mode in which the fuel cell stops generating power, and the data regarding the preset current value required to release the fuel-cell stop mode, which are stored in the database, include data regarding a first current value required to enter the fuel-cell stop mode, data regarding a first current value required to release the fuel-cell stop mode, data regarding a second current value required to enter the fuel-cell stop mode and data regarding a second current value required to release the fuel-cell stop mode, wherein each of the first current value required to enter the fuel-cell stop mode and the first current value required to release the fuel-cell stop mode is a fixed value, and wherein each of the second current value required to enter the fuel-cell stop mode and the second current value required to release the fuel-cell stop mode is a value that varies linearly in proportion to the SOC of the high voltage battery.

14. The system of claim 13, wherein the controller is configured to operate the fuel cell to perform or stop the power generation of the fuel cell by comparing the required current of the vehicle with a preset first current value required to enter the fuel-cell stop mode and first current value required to release the fuel-cell stop mode, when the required current of the vehicle is within the preset range from the minimum recommended SOC to the maximum recommended SOC.

15. The system of claim 14, wherein the controller is configured to:
   stop the power generation of the fuel cell when the required current of the vehicle becomes equal to or less than the first current value required to enter the fuel-cell stop mode when the required current of the vehicle is within the preset range from the minimum recommended SOC to the maximum recommended SOC and the fuel cell is generating power; and
   perform the power generation of the fuel cell when the required current of the vehicle becomes equal to or greater than the first current value required to release the fuel-cell stop mode when the required current of the vehicle is beyond the preset range from the minimum recommended SOC to the maximum recommended SOC and the fuel cell is being stopped.

16. The system of claim 14, wherein the controller is configured to maintain a preceding operation state of the fuel cell, when the required current of the vehicle is within the preset range from the minimum recommended SOC to the maximum recommended SOC and the required current of the vehicle is between the first current value required to enter the fuel-cell stop mode and the first current value required to release the fuel-cell stop mode.

17. The system of claim 13, wherein the controller is configured to perform or stop the power generation of the fuel cell by comparing the required current of the vehicle with a preset second current value required to enter the fuel-cell stop mode and a preset second current value required to release the fuel-cell stop mode, when the required current of the vehicle is beyond the preset range from the minimum recommended SOC to the maximum recommended SOC.

18. The system of claim 17, wherein the controller is configured to:
   stop the power generation of the fuel cell when the required current of the vehicle becomes equal to or less than the second current value required to enter the fuel-cell stop mode when the required current of the vehicle is beyond the preset range from the minimum recommended SOC to the maximum recommended SOC and the fuel cell is generating power; and
   perform the power generation of the fuel cell when the required current of the vehicle becomes equal to or greater than the second current value required to release the fuel-cell stop mode when the required current of the vehicle is beyond the preset range from the minimum recommended SOC to the maximum recommended SOC and the fuel cell is being stopped.

19. The system of claim 17, wherein the controller is configured to maintain a preceding operation state of the fuel cell, when the required current of the vehicle is beyond the preset range from the minimum recommended SOC to the maximum recommended SOC and the required current of the vehicle is between the second current value required to enter the fuel-cell stop mode and the second current value required to release the fuel-cell stop mode.

* * * * *